Patented Jan. 25, 1927.

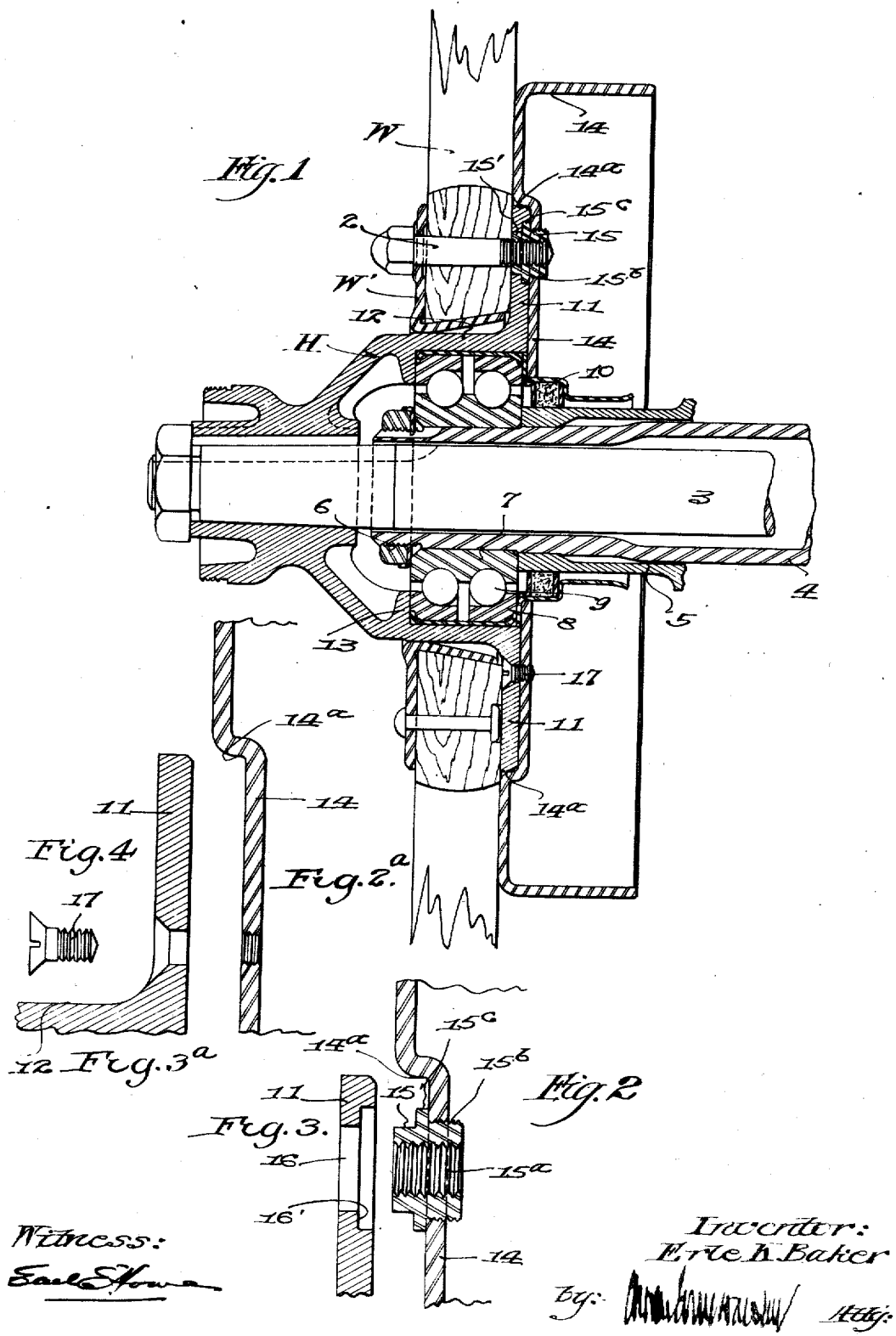

1,615,253

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

HUB CONSTRUCTION FOR DEMOUNTABLE WHEELS.

Application filed July 28, 1922. Serial No. 578,158.

My invention relates to improvements in demountable wheels for motor vehicles, said improvements having special reference to the construction of motor vehicle hubs for the reception of demountable wheels. And more especially my invention relates to improvements which shall particularly adapt such hubs for the reception of wheels of the demountable types disclosed in my former Patents 1,321,000-1, and 1,334,011. Such wheels, and some others, are characterized by a wooden hub center portion which is clamped against the back flange of the metal hub of the vehicle by means of a plurality of hub bolts. The arrangement of these bolts in the flanges of the driving hubs is attended with considerable difficulty, the construction being complicated by the presence of the brake drums. The difficulty is further accentuated when the hubs are of the kinds used with floating and semi-floating axles.

The object of this invention is to provide a hub construction peculiarly adapted to demountable wheels and of a universal order concerning the several types of hubs used with live, floating, and semi-floating axles.

My invention comprises a novel wheel hub of the construction and combination of parts hereinafter described and particularly pointed out in the appended claims; and, will be readily understood on reference to the accompanying drawings which form a part of this specification; in which—

Fig. 1 is a sectional view of the axle, hub and wheel embodying my invention.

Fig. 2 is a vertical detail sectional view through a part of the brake drum showing the manner of securing a certain nut therein.

Fig. 3 is a vertical detail sectional view through that portion of the back flange of the hub associated with that part of the brake drum shown in Fig. 2.

Fig. 2ª is a vertical detail sectional view through another part of the brake drum with which another part of the hub flange engages.

Fig. 3ª is a vertical detail sectional view through that portion of the back flange of the hub associated with that part of the brake drum shown in Fig. 2ª.

Fig. 4 is a view in side elevation of one means which may be used to detachably secure together, that part of the brake drum and that part of the back flange shown in Figs. 2ª and 3ª, respectively.

At the beginning it should be understood that this invention is not limited to any particular demountable wheel except in so far as the demountable wheel W is of a kind to be secured to the vehicle by a plurality of hub bolts 2. The particular wheel shown in these drawings will be found in Letters Patent 1,334,011 and does not require extended description herein. Similarly the combined center sleeve and outer flange W' here illustrated, will be found in my pending application Serial No. 608,613. As stated my invention is applicable to motor vehicle axles of all types; but, as being sufficient for the purposes of this invention I have restricted the illustration to a so-called floating axle construction, wherein every part of my present invention, including the brake drum, has a direct operative relation.

Referring to Fig. 1, which best shows all of the details, 3 represents the floating axle, 4 the axle housing, 5 the fixed sleeve of the brake hanger (not shown), 6 the stop nut on the end of the housing 4, and 7 the inner ring of the ball bearing which ring is held between the parts 5 and 6. The outer rings 8 and the balls 9 are of usual construction; and it goes without saying that this particular ball bearing is merely exemplary of any bearing that may be used. The oil packing 10 is also of usual construction.

The hub H receives the end of the floating axle 3 and the anti-friction bearing described; and is characterized by an integral back flange 11 and a cylindrical barrel portion 12. The bearing is held between the internal shoulder 13 and the brake drum 14, which latter is secured against the inner side of the flange 11 by the means about to be described.

As shown, the wheel fits over the barrel portion 12 of the hub and against the outer face of the hub flange 11. It is secured in that position by the before-mentioned hub bolts 2, which pass through the outer hub flange W', through the hub center portion of the wheel, and into nuts 15, which nuts may be made of any desired metal, better than that composing the hub H. The nut 15 in its best form comprises the cylindrical body portion 15' containing the internal thread 15ª for the hub bolt. It has the external thread 15$^b$ for the reception of the brake drum; and is provided with the stop flange or collar 15$^c$, the edge of which is preferably octagonal to facilitate the placing of the nut in the brake drum.

The brake drum contains as many holes as there are hub bolts 2, and these holes are threaded to receive the threads 15$^b$ of respective nuts 15. The nuts are screwed tight therein. The brake drum thus equipped with the nuts is placed against the hub flange 11, which latter contains the openings 16 shaped to receive the parts 15' and 15$^c$ and hence each presenting a stop shoulder 16'. When thus positioned on the flange 11 with the nuts properly sunk in the shoulder openings 16, the brake drum is secured or locked to the hub flange by means of one or more short screws or rivets 17.

As will be apparent the hub bolts 2 when driven home in the nuts 15 serve to bind the wheel, the hub flange, and the brake drum so firmly together that they cannot be displaced or dislodged except by the intentional loosening of the hub bolts 2.

Thus secured the brake drum incidentally serves to fasten in place the anti-friction bearing of the floating axle, as before explained; and the hub can only be removed from the axle by first demounting the wheel and afterward removing the locking screws 17.

Those skilled in the art will immediately understand that a hub designed for use upon a live axle may have its brake drums permanently riveted to its back flange; thereby avoiding the use of the locking screws 17, which according to my invention, are typical of a hub identified with a floating axle or a semi-floating axle.

A particular novel feature to which I call attention, comprises the center sink which I provide in the brake drum whereby the latter is provided with a centering shoulder 14$^a$ for co-action with the periphery of the hub flange 11, and an offset outer portion which may rest directly against the wheel spokes.

In its entirety my improved hub is admirably suited to fill every requirement concerning the driving axle, the wheel, and the brake drum, and will be found to be much stronger, more convenient, and of less weight and cost than the several vehicle hubs in present use.

Having thus described my invention, I claim as new and desire to secure by Letters Patent—

1. A construction of the kind described embodying therein, a hub including a back flange member having a plurality of openings therein, a brake drum member engaged flat against said back flange member and having a plurality of openings adapted to register with said back flange openings, nuts each having portions arranged in said registering openings in said members and being fixed against endwise movement in the openings in one member and being held against a turning movement in the openings in the other member, a wheel center mounted on the hub and bolts passing through said wheel center and threaded into said nuts.

2. A construction of the kind described embodying therein, a hub including a back flange member having a plurality of stepped openings therein, a brake drum member engaged flat against said back flange member and having a plurality of openings adapted to register with said back flange openings, nuts each having stepped portions on one end and an exteriorly threaded portion on the other end, with the stepped portions arranged in the stepped openings in the back flange and with the exteriorly threaded portion engaged in the openings in the brake drum, a wheel center mounted on the hub and bolts passing through the wheel center and threaded into said nuts.

3. A construction of the kind described embodying therein, a hub including a back flange member having a plurality of openings therein, a brake drum member engaged flat against said back flange member and having a plurality of openings adapted to register with said said back flange openings, nuts each having portions arranged in said aligned openings in said members and being fixed against endwise movement in the openings in one member and being held against a turning movement in the openings in the other member, a wheel center mounted on the hub, bolts passing through said wheel center and threaded into said nuts, and other means for securing said brake drum and back flange together when said bolts have been removed from said nuts.

4. A construction of the kind described embodying therein a hub including a back flange, a brake drum having a centrally arranged depression in its front face in which said back flange snugly fits so that the front face of the outer portion of the brake drum is flush with front face of the back flange, a wheel center mounted on the hub and engaged with both the back flange and brake drum, means passing through the wheel center, back flange and brake drum for removably securing them together and other means independent of said bolts for securing said back flange and brake drum together.

5. A construction of the kind described embodying therein a hub including a back flange, a brake drum having a centrally arranged depression in its front face in which said back flange snugly fits so that the front face of the outer portion of the brake drum is flush with the front face of the back flange, a wheel center mounted on the hub and engaged with both the back flange and brake drum, means passing through the wheel center, back flange and brake drum for removably securing them together and other means independent of said bolts for detachably securing said back flange and brake drum together independent of said bolts, said last mentioned means being accessible for actuation only after the wheel center has been removed from the hub.

In testimony whereof, I have hereunto set my hand this 24th day of July, 1922.

ERLE KING BAKER.

flange, a wheel center mounted on the hub and engaged with both the back flange and brake drum, means passing through the wheel center, back flange and brake drum for removably securing them together and other means independent of said bolts for detachably securing said back flange and brake drum together independent of said bolts, said last mentioned means being accessible for actuation only after the wheel center has been removed from the hub.

In testimony whereof, I have hereunto set my hand this 24th day of July, 1922.

ERLE KING BAKER.

Certificate of Correction.

Patent No. 1,615,253, granted January 25, 1927, to

ERLE KING BAKER.

It is hereby certified that error appears in the printed specification of the above-mentioned patent requiring correction as follows: Page 2, line 97, claim 3, strike out the word " said," second occurrence; and that the said Letters Patent should be read with this correction therein that the same may conform to the record of the case in the Patent Office.

Signed and sealed this 1st day of March, A. D. 1927.

[SEAL.]

M. J. MOORE,
*Acting Commissioner of Patents.*

Certificate of Correction.

Patent No. 1,615,253, granted January 25, 1927, to

ERLE KING BAKER.

It is hereby certified that error appears in the printed specification of the above-mentioned patent requiring correction as follows: Page 2, line 97, claim 3, strike out the word "said," second occurrence; and that the said Letters Patent should be read with this correction therein that the same may conform to the record of the case in the Patent Office.

Signed and sealed this 1st day of March, A. D. 1927.

[SEAL.]
M. J. MOORE,
*Acting Commissioner of Patents.*